April 30, 1963   F. W. KULICKE, JR   3,087,228
TUBULATION LEAD WELDING MACHINE
Filed July 29, 1959   5 Sheets-Sheet 1

INVENTOR
F. W. KULICKE JR.
By
ATTORNEY

April 30, 1963 F. W. KULICKE, JR 3,087,228
TUBULATION LEAD WELDING MACHINE
Filed July 29, 1959 5 Sheets-Sheet 3
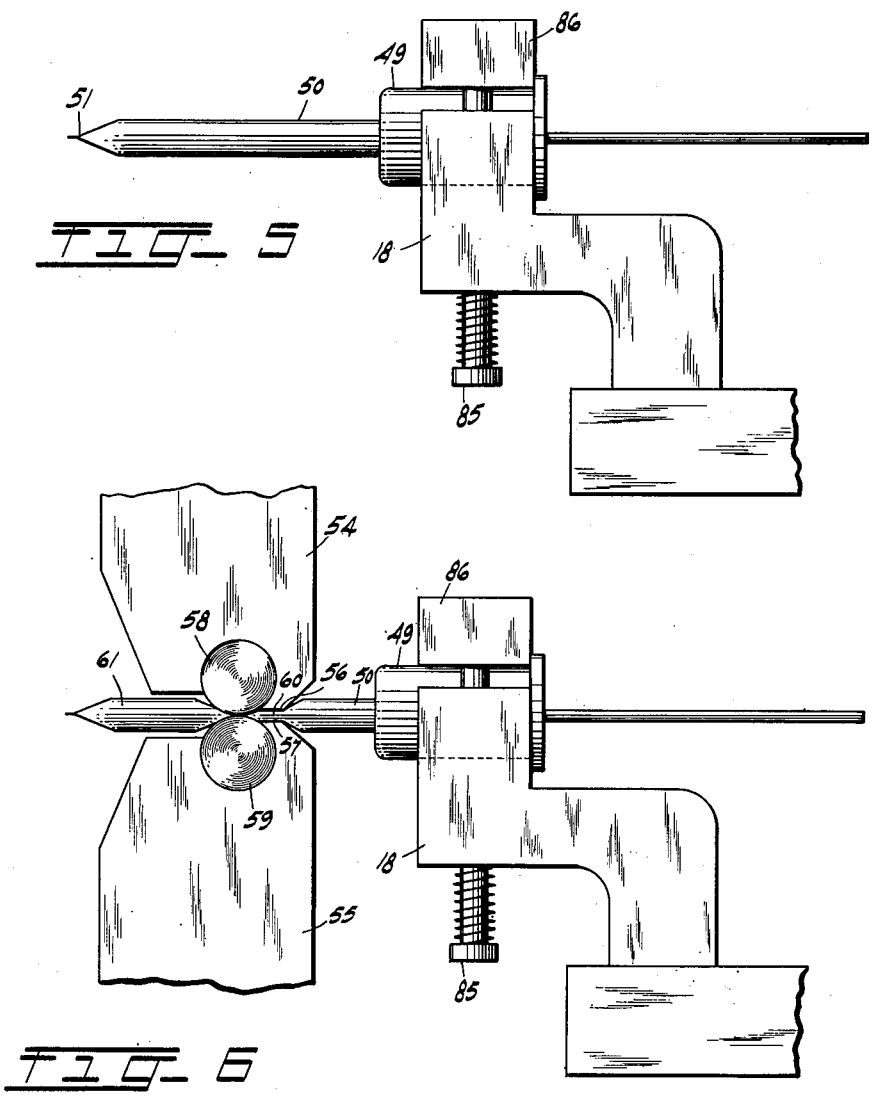
INVENTOR
F.W.KULICKE JR.
By
ATTORNEY

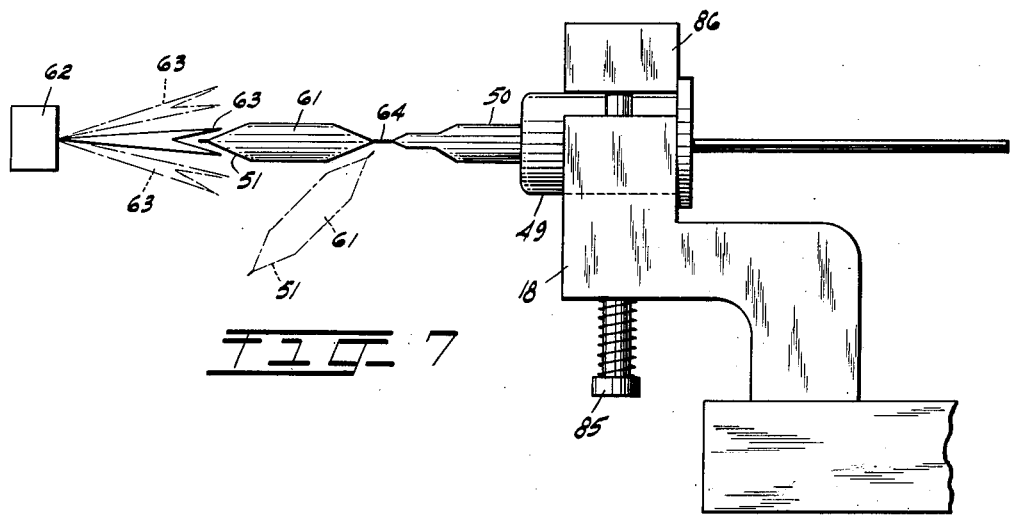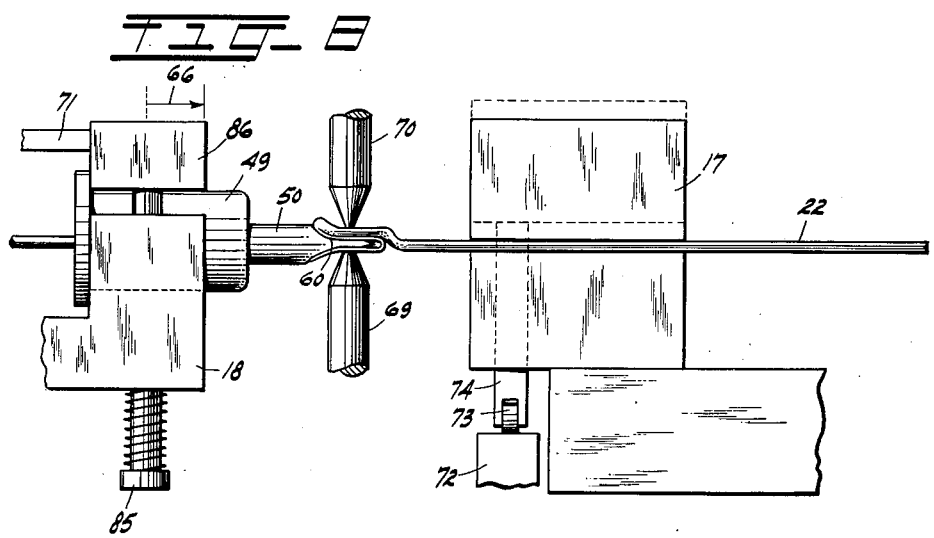

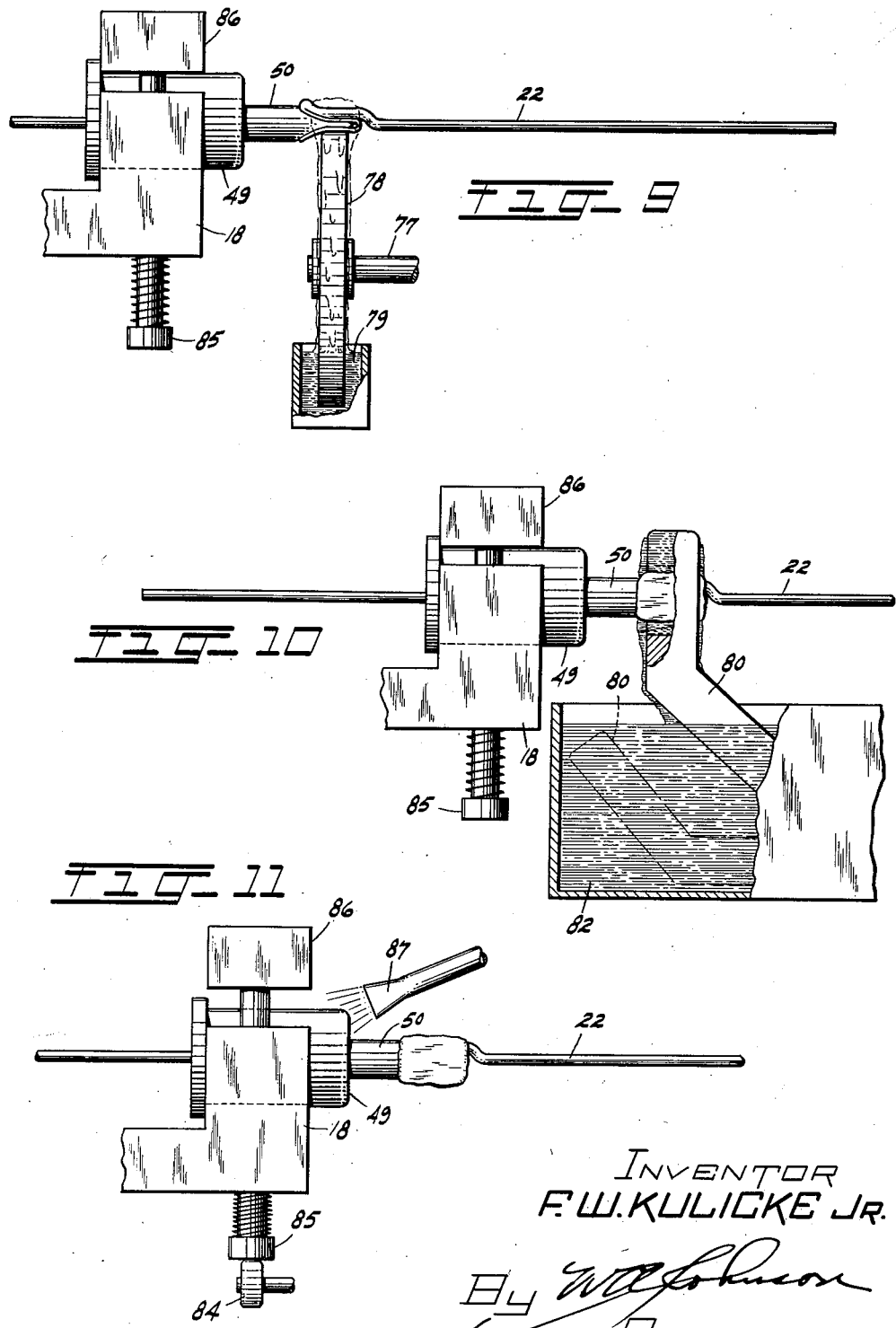

United States Patent Office 3,087,228
Patented Apr. 30, 1963

3,087,228
TUBULATION LEAD WELDING MACHINE
Frederick W. Kulicke, Jr., Philadelphia, Pa., assignor to Western Electric Company, Incorporated, New York, N.Y., a corporation of New York
Filed July 29, 1959, Ser. No. 830,408
10 Claims. (Cl. 29—25.19)

This invention relates to methods of and apparatus for joining lengths of wire to articles, particularly articles having tubular projections.

In the manufacture of certain electrical components such as diodes, the metallic casings of which have sealed metallic tubulations, wires of predetermined lengths are to be secured to the tubulations after the tubulations have been pinched off to the desired length. This presents a problem of not only reducing each tubulation in length, forming a new sealed end therefor and conditioning it to be secured to one end of a wire, but also conditioning the wire so that it may be secured to the tubulation and be disposed in central alignment therewith.

Objects of the invention are the provision of a method and an apparatus by the aid of which the method may be practiced to bring about efficiently the joining of a wire to an article.

In accordance with the objects, one embodiment of the invention comprises the method of joining a length of wire and a metal portion of the article by flattening one end of the wire, bending the flattened end to form a pocket thereof, inserting the portion of the article in the pocket, and securing the wire and metal portion together at the pocket to form a joint.

More specifically, the apparatus, by the aid of which the method may be practiced, includes wire and article holders movable individually relative to separate stations so that a length of wire held in the wire holder, when moved with respect to individual stations, will have an end thereof flattened and subsequently formed into a pocket and at a station common to both holders, the projection of the article will be inserted into the pocket and secured in place.

Other objects and advantages will be apparent from the following detailed description when considered in conjunction with the accompanying drawings wherein:

FIG. 5 is a fragmentary side elevational view of one of the article holders;

FIG. 6 is a fragmentary side elevational view of the article holder at the pinching and forming station;

FIG. 7 is a fragmentary side elevational view of the article holder at the vibrating station;

FIG. 8 is a fragmentary side elevational view of both wire and article holders at the common or welding station;

FIG. 9 is a fragmentary side elevational view of the article holder at the flux applying station;

FIG. 10 is a fragmentary side elevational view of the article holder at the soldering applying station; and FIG. 11 is a fragmentary side elevational view of the article holder at the ejecting station.

Figure 1:
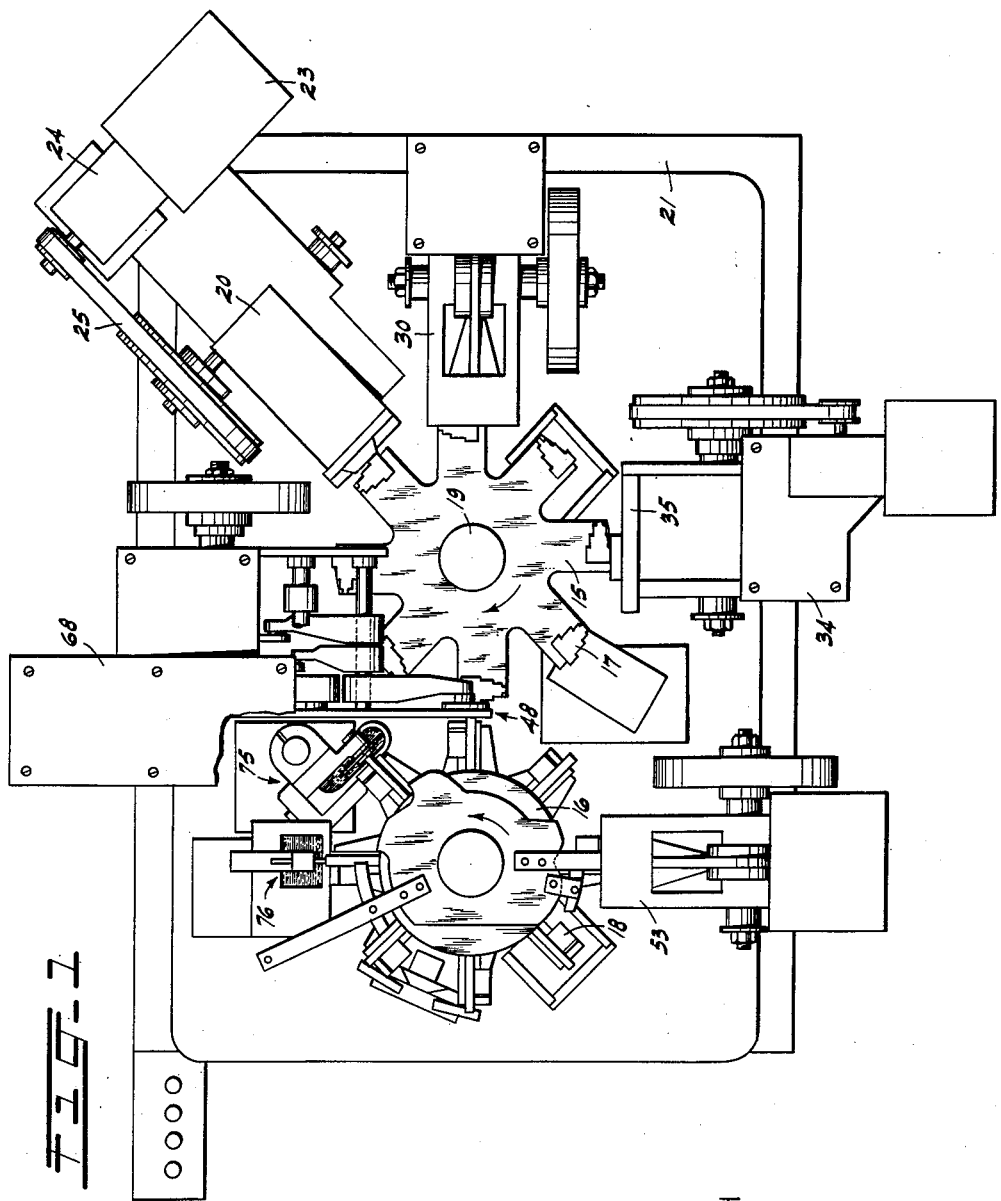
FIG. 1 is a top plan view of the apparatus.
Figure 2:
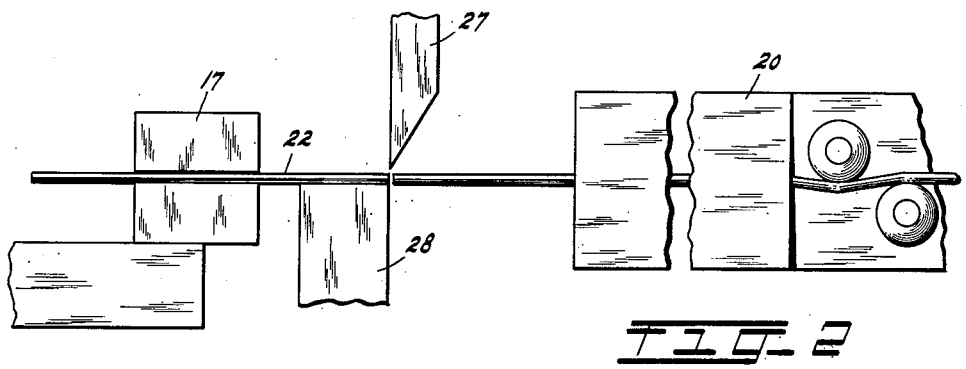
FIG. 2 is a schematic elevational view of a wire holder at the wire feeding and cutting station.

The apparatus, as shown in FIG. 1, has turrets 15 and 16 rotatable intermittently in the directions of their arrows to carry respectively wire holders 17 and article holders 18 to separate work stations and a station common to both. With reference to the turret 15, the eight arms and their eight wire holders 17 represent eight positions between successive intermittent motions of the turret 15 during each cycle of operation about its axis 19. A wire feeding unit 20 is mounted on a main support 21 to feed lengths of wire 22 to the holder 17 in that position. The unit 20 is driven by a motor 23 energized to drive a speed reducing unit 24 and a suitable mechanism 25 including a one-revolution clutch to bring about a complete cycle of operation to feed a length of wire, as illustrated in FIG. 2, and to cause operation of companion cutters 27 and 28 to cut the length of wire from the supply.

A unit 30 includes tools 31 and 32 actuated under single cycles each time a wire is moved adjacent that station to flatten a given length of the end of the wire 22.

Figure 4:
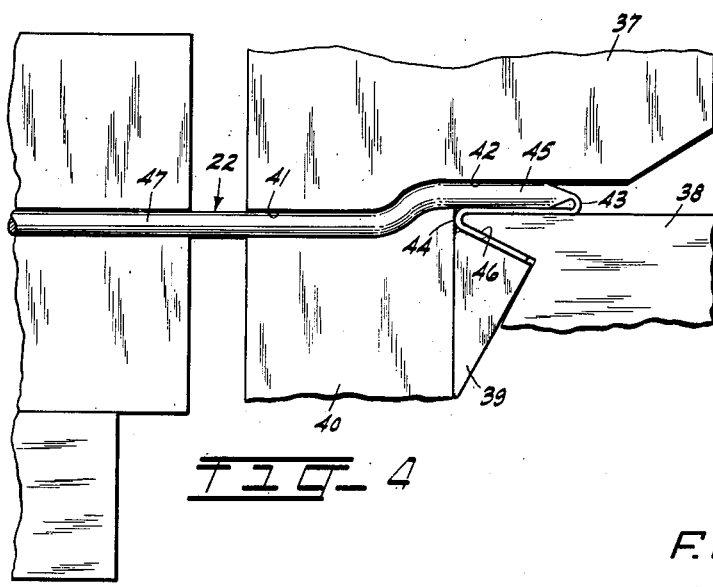
FIG. 4 is an enlarged schemaitc side elevational view of the wire holder with the flattened wire at the forming station.

At the next operating station 34, a unit 35 is actuated to form not only the flattened end of the wire but the adjacent unflattened portion of the wire. This is accomplished by tools 37, 38, 39, and 40, shown in FIG. 4. The tool 37 is at a fixed position or it may be moved to position where a surface 41 thereof will engage a top portion of the wire and provide an off-set portion 42. The tools 38 and 39 are moved relative to each other and to the tools 37 and 40 to form bends 43 and 44 in the flattened portion of the wire, to cooperate with the tool 40 in off-set bending the adjacent unflattened portion 45 of the wire and to produce a pocket 46, which is in somewhat alignment with the remaining unflattened portion 47 of the wire. After the tools 37 to 40, inclusive, return to their normal positions, the formed wire moves to a station indicated generally at 48 where the wire will be joined with the article.

In FIG. 5 the article or component 49, which has been inserted manually into the holder 18 at a loading station, has a metallic tube 50 which is sealed at 51 but is longer than is desired. The tube 50 must be reduced in length without affecting a continuous seal thereof, sealed in a new position which will be the new end of the tube and flattened adjacent the new end for securing to the wire. These three functions are performed by a unit 53 having tools 54 and 55 with flattennig portions 56 and 57 and also hardened rod-like portions 58 and 59 to pinch the tube 50 forming a new sealed end adjacent a flattened portion 60 thereof. This leaves an excess length 61 of the tube 50 which is caused to be removed at the next station by a vibrating unit 62. The unit 62 has a forked arm 63 positioned to interengage the end 51 of the length 61 and through the vibrating action, illustrated in FIG. 7, cause the excess length 61 to break at the new sealed end 64.

At the common station 48, the wire holder 17 moves its formed wire into that station and at the same time, the article holder 18 moves its article with the reconditioned projection or metal tube into alignment with the pocket 46. Immediately after reaching the station 48, the holder 18 is moved in the direction of the arrow 66, to move the flattened end 60 of the tube 50 into the pocket. As soon as this has been accomplished, a welding unit 68 is operated causing its electrodes 69 and 70 to apply suitable opposing forces through opposite sides of the interconnected structure of the wire and tube, to form a joint thereof by closing the pocket on the flattened end of the tube and welding both flattened portions of the wire forming the pocket and the off-set portion of the wire to each other and to the flattened end of the tube.

In FIG. 8 the actual moving means for the holder 18 is not shown in detail but, as a suggestion, any suitable means such as a cam or push rod 71 may be actuated to bring about this movement. Prior to movement of the turrets 15 and 16, the wire holder 17 is opened by suitable means, such as illustrated in FIG. 8, through the aid of a cam 72, a cam follower 73, and suitable means 74 connecting the cam follower to a movable portion of the holder 17. This permits the wire, which has been joined to the metallic tube of the article, to move with the article through the next stations 75 and 76 of FIG. 1. The station 75 includes a unit for driving a shaft 77 for rotating an applicator wheel 78 continuously through a bath 79 of flux, as illustrated in FIG. 9, to apply a coating of flux to the joint of the wire and metal tube. At station 76, a bifurcated arm 80, normally positioned as shown in broken lines in FIG. 10 in a bath 82 of molten solder, is moved by suitable means, not shown, to the solid line position to straddle the joint formed between the wire 22 and the metal tube 50 to cover the joint with solder.

The last station of the cycle of the turret 16 may be defined as the ejecting station where a cam 84 engages a cam follower 85 to force open a movable portion 86 of the holder 18 to free the completed article with its wire joined thereto so that it may be forced from the holder by a blast of air from a nozzle 87.

Operation

Figure 3:
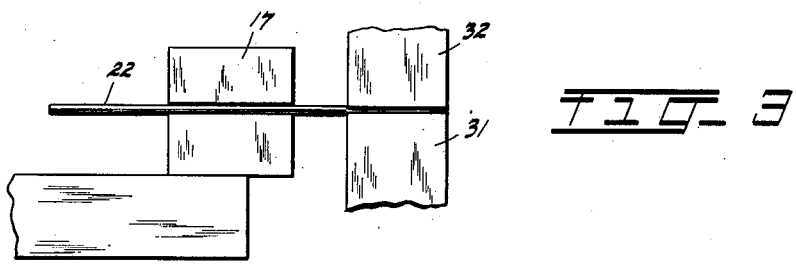
FIG. 3 is a schematic side elevational view of the wire holder at the flattening station.

With the exception of manually feeding the articles to the holders 18, the apparatus, by the aid of which a method may be practiced, is completely automatic in its operations. The turrets 15 and 16 move intermittently to receive, respectively, the lengths of wire and the articles in their holders 17 and 18 and to move relative to separate stations. The turret 15 moves the holders 17 successively to receive the lengths of wire 22 from the unit 20 at one station, FIG. 2, have the end of each wire flattened at the station, FIG. 3, have the pocket 46 formed in the wire by producing the bends 43 and 44 and have, at the same time, the unflattened adjacent portion of the wire off-set to align the pocket with the main unflattened portion of the wire to locate the wire when joined to the tube in direct alignment with the center line of the tube. While the wires are being formed, the successive tubes are shortened in length, FIG. 6, provided with new sealed ends and flattened to enter the pockets 46 of the wires at the station 48. At this station, when each wire is joined to its article, the wire leaves the station 48 with the article and during the next three stations, the joint is given a coating of flux, then a coating of solder, and then the entire completed structure is ejected from the apparatus.

Although straight wires may be secured to a tube, such as by welding, the connection would not be sufficiently strong as it would be between two round objects. The application of sufficient force to flatten the wire and tube during welding would weaken the wire and possibly disturb the sealed end of the tube. Furthermore, and more important, the sealed end would remain exposed to disturbing conditions which may open or unseal the end. The purpose of the formation of the end of the wire and the forming of the pocket is to provide a better and stronger connection and a protective shield for the sealed end of the tube.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for joining a length of wire to a projection of an article comprising a wire holder, an article holder actuable to hold the article with the projection in a given position, means operable to feed a length of wire to the wire holder, means supporting the wire holder and movable to move the wire holder with the wire successively to different stations, means operated at one of the stations to form the wire to provide spaced portions thereof for engagement with spaced portions of the projection, means operable at another station to cause relative movement of the holders to cause interengagement of the projection and the portions of the formed end of the wire, and means to secure the portions of the wire to the projection.

2. An apparatus for joining a length of wire to a projection of an article comprising a wire holder, an article holder actuable to hold the article with the projection in a given position, means operable to feed a length of wire to the wire holder, a support for the wire holder movable to move the wire holder with the wire successively to different stations, tools operated at one of the stations to flatten a given length of the wire at an outer end thereof, tools operated at another station to bend the flattened end of the wire to form a pocket therein, means to cause relative movement of the holders at another station to cause the projection to extend into the pocket, and means to secure the projection in the pocket.

3. An apparatus according to claim 2 in which the tools at the bending station include a backing tool for engaging an unflattened portion of the wire, and grippers actuated to grip a portion of the flattened end and form a pocket of the flattened end by cooperating with the backing tool to form bends in the flattened end.

4. An apparatus according to claim 3 in which the backing tool has an off-set portion for engagement with a length of the unflattened portion adjacent the pocket, and a forming tool cooperating with the off-set portion of the backing tool to off-set the length of the unflattened portion and to adapt the grippers to position the pocket in alignment with the remaining unflattened portion of the wire.

5. An apparatus for joining a length of wire to a tubular projection of an article comprising a holder adapted for movement into open and closed positions to removably hold the article, a holder actuable into open and closed positions to removably hold a wire, separate supports for the holders movable intermittently to separate forming stations and to a common joining station, means at one of the separate stations to bend an end of the wire to form a pocket thereof, means at another of the separate stations to flatten an end of the tubular projection and seal said end closed, means at the common station to cause relative movement of the holders to cause insertion of the sealed flattened end of the tubular projection in the pocket, and means to form a joint of the wire and article by securing the flattened tubular end in the pocket.

6. An apparatus according to claim 5 in which means is actuated at the common station to free the joined wire from its holder to move with the article holder.

7. An apparatus according to claim 6 in which means is operated at another separate station to open the article holder, and means operable subsequent to the opening of the article holder to force the article and joined wire therefrom.

8. An apparatus according to claim 5 in which a part of the securing means includes an applicator operable at another separate station to cover the joint with flux, and means operable at another separate station to cover the joint with molten solder.

9. An apparatus according to claim 8 in which the tubular projection flattening means includes companion tools operated to pinch the tubular projection closed at a given length back of the free end of the projection, and a unit operated to oscillate the length of the projection to break it free of the pinched portion to leave a sealed end for connection with the wire.

10. An apparatus according to claim 5 in which the securing means for the joint includes a welding unit with electrodes moved under pressure against the joint, an applicator operable at another separate station to apply a coating of flux to the joint, and an applicator operable at another separate station to apply a coating of solder to the joint.

References Cited in the file of this patent

UNITED STATES PATENTS

| | | |
|---|---|---|
| 1,615,654 | Ryder | Jan. 25, 1927 |
| 2,121,641 | Mickley | June 21, 1938 |
| 2,135,288 | Koenig | Nov. 1, 1938 |
| 2,143,369 | Dubilier | Jan. 10, 1939 |
| 2,258,750 | Eichwald | Oct. 14, 1941 |
| 2,324,177 | Smith | July 13, 1943 |
| 2,342,041 | Bold | Feb. 15, 1944 |
| 2,571,078 | Vollmer | Oct. 9, 1951 |
| 2,720,690 | Mullan et al. | Oct. 18, 1955 |
| 2,820,486 | Brent et al. | Jan. 21, 1958 |
| 2,828,777 | Frank | Apr. 1, 1958 |
| 2,856,674 | Hill | Oct. 21, 1958 |
| 2,861,324 | Klumpp | Nov. 25, 1958 |

FOREIGN PATENTS

| | | |
|---|---|---|
| 552,126 | Great Britain | Mar. 24, 1943 |